(12) United States Patent
Nemiroff et al.

(10) Patent No.: US 7,606,303 B2
(45) Date of Patent: Oct. 20, 2009

(54) METHOD AND APPARATUS TO DETECT ANCHOR FRAMES FROM DIGITAL VIDEO STREAMS

(75) Inventors: Robert S. Nemiroff, Carlsbad, CA (US); Yong He, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1193 days.

(21) Appl. No.: 10/952,116

(22) Filed: Sep. 28, 2004

(65) Prior Publication Data

US 2006/0072832 A1   Apr. 6, 2006

(51) Int. Cl.
  *H04N 7/12* (2006.01)
  *H04N 11/02* (2006.01)
  *H04L 7/00* (2006.01)
(52) U.S. Cl. .................. 375/240.01; 375/240.16; 375/368
(58) Field of Classification Search ............. 375/240.1, 375/368, 240.16
See application file for complete search history.

(56) References Cited

U.S. PATENT DOCUMENTS

| | | | | |
|---|---|---|---|---|
| 5,929,916 A | * | 7/1999 | Legall et al. | 375/240.05 |
| 6,307,594 B1 | * | 10/2001 | Yamauchi | 348/512 |
| 6,771,825 B1 | * | 8/2004 | Hurst, Jr. | 382/236 |
| 6,865,240 B1 | * | 3/2005 | Kawataka | 375/368 |
| 7,209,635 B2 | * | 4/2007 | Hatabu | 386/52 |
| 2004/0179137 A1 | * | 9/2004 | Iwata et al. | 348/459 |

* cited by examiner

*Primary Examiner*—Tung Vo
*Assistant Examiner*—Anner Holder

(57) ABSTRACT

A method (60) and apparatus process video in a multiple encoder system by identifying (61) those frames that were originally encoded as anchor frames in the first encoder and ensuring that a second encoder encodes (65) these identified frames as anchor frames rather than bidirectional frames or non-anchor frames. In addition, the second encoder identifies (62) those frames that were originally encoded as non-anchor frames in the first encoder and encodes (66) the non-anchor frames, such as bidirectional frames, as non-anchor frames during the second encoding process. Once the anchor and non-anchor frames are identified, a frame-type pattern is determined (63) by the first encoder and synchronizes (64) the second encoder to the frame-type pattern.

44 Claims, 10 Drawing Sheets

ABSOLUTE

METHOD AND APPARATUS TO DETECT ANCHOR FRAMES FROM DIGITAL VIDEO STREAMS

FIELD OF THE INVENTION

The present invention relates generally to methods and apparatuses for processing digital information, and more particularly to a method and apparatus for processing digital information prior to transmission over a network.

BACKGROUND

Many cable television headends receive program content from satellite streams. The cable headend may choose programs from several satellite sources. The sum of the bit rates of the selected programs may exceed the cable headend available output bandwidth. In this case, the headend must either transcode or decode & re-encode the video streams. This requires a cascaded decoder and second encoder at the cable headend. The first encoder may originate from two sources; one is located at the programmer uplink, the other may be the encoder used to compress data for a video server. The second encoder is also referred to as the re-encoder.

Multiple encoding processes, however, can result in inefficient allocation of encoding resources in the second encoder.

The present invention is therefore directed to the problem of developing a method and apparatus for processing video frames that ensures that encoding resources are efficiently applied against incoming video data during multiple encoding processes.

SUMMARY OF THE INVENTION

The present invention solves these and other problems by identifying those frames that were originally encoded as anchor frames and ensuring that the second encoder (e.g., the re-encoder) encodes these frames as anchor frames rather than bidirectional frames. Moreover, the present invention provides that the second encoder encodes the non-anchor frames, such as bidirectional frames, as non-anchor frames during the second encoding process. Once the anchor frames (and non-anchor frames) are identified, the present invention also synchronizes the second encoder to the encoding sequence of the first encoder, thereby ensuring optimal utilization of encoder resources.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
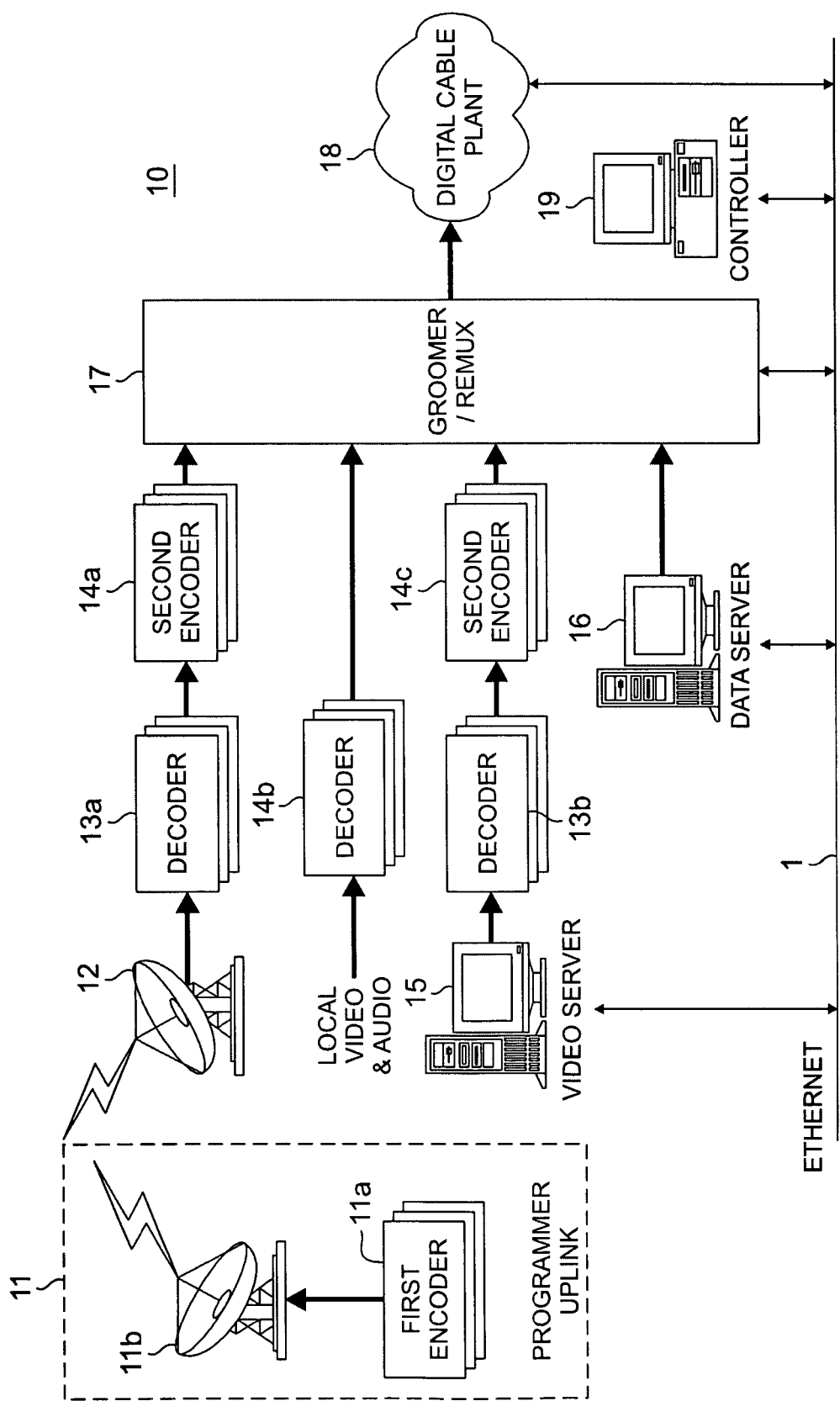
FIG. 1 depicts an exemplary embodiment of a cable headend encoding system according to one aspect of the present invention.

Turning to FIG. 1, shown therein is an exemplary embodiment of communication system with a cable headend system 10 in which cascaded decoders and encoders are employed. The content is originally uploaded to the cable headend from the programming uplink 11, which includes at least a first encoder 11a and a satellite transmitting antenna or dish 11b. The headend 10 includes a receiving dish or antenna 12 followed by a first decoder 13a, a second encoder (one of several possible) 14a, whose output is coupled to the groomer/remux 17. A local encoder 14b has its output also coupled to the groomer/remux 17. This local encoder encodes programming that originates at the cable headend 10. Video server 15 outputs video content to a second decoder 13b, which is re-encoded in the second encoder 14b, the output of which is coupled to the groomer/remux 17. Data server 16 has its output coupled to the groomer/remux 17, the output of which is forwarded to the digital cable plant 18. Controller 19 is coupled to the video server 15, the data server 16, the groomer/remux 17 and the digital cable plant 18 via Ethernet 1.

If the cable headend 10 chooses to decode and re-encode the video streams, it is beneficial to re-encode each frame with the same frame type as the originally encoded stream. I-type and P-type anchor frames typically have better quality than Bi-Directional (B-type) frames for better overall video quality. If the frame was originally encoded as B-type, then the re-encoder should also encode that frame as a B-type, thereby ensuring that fewer encoding resources are applied to those frames with less informational content (i.e., lower video quality). The same is true for P-type & I-type frames, i.e., applying higher encoding resources to frames with higher informational content (i.e., higher video quality). Otherwise, encoding resources will be applied in an inefficient manner, i.e., higher bits may be assigned to video frames with less informational content (e.g., originally encoded B-type frames) than other frames (e.g., originally encoded anchor frames). I-type & P-type frames are referred in MPEG-2 as anchor frames, however, the present invention is not necessarily limited to detecting only I-type and/or P-type frames. Any frames that are used as references for decoding other frames can be considered herein as anchor frames. Similarly, any frames that are not used as references for decoding other frames can be considered non-anchor frames herein.

The present invention ensures proper allocation of encoding resources in a video processing system in which multiple encoding processes occur by identifying those frames that were originally encoded as anchor frames and ensuring that the second encoder (e.g., the re-encoder) encodes these originally encoded anchor frames as anchor frames during its encoding process, rather than bidirectional frames; and encodes the non-anchor frames, such as bidirectional frames, as non-anchor frames during the second encoding process. Once the anchor frames (and non-anchor frames) are identified, the present invention then synchronizes the second encoder to the encoding sequence of the first encoder, thereby ensuring optimal utilization of encoder resources.

An exemplary embodiment of the present invention includes a method for identifying anchor frames based on spatial activity. However, other techniques for sorting the frames between anchor and non-anchor frames may suffice without departing from the present invention. Furthermore, the embodiment herein identifies a pattern, if present, in the anchor frames, and synchronizes the re-encoder to the identified sequence of anchor frames. If no pattern is present (or detectable) the second encoder simply encodes in the normal manner.

By measuring the spatial activity of each frame, a pattern may emerge showing which frames are anchor frame and which frames are B-type frames. Typically, B-type frames have lower activity than anchor frames. Therefore, measuring spatial activity enables categorization of those frames with relatively high spatial activity and those with relatively low spatial activity. For purposes herein, it is not necessary to distinguish between I-type and P-type frames because a high-end encoder will choose which anchor frames become I-type frames based on detected scene changes and a predetermined I-type frame refresh rate (referred as "N" in MPEG-2 syntax).

Once a pattern of the type of frames is identified or achieved, the pattern must be tracked. Although most encoders keep the number of B-type frames between anchor frames constant, the pattern may be disrupted by synchronization loss at either the first encoder or the second encoder. In addition the first and second encoder may have different film mode results, which would affect frame type alignment.

In an exemplary embodiment of an encoder, frame activity is already computed by the Motorola DCII encoder for rate control purposes, so there is no additional processing cost to compute this data.

According to another aspect of the present invention, frame activity is computed by dividing a frame into two fields and then dividing each field into blocks, such as 8×8 blocks. For each 8×8 block, the absolute difference between each horizontally adjacent and vertically adjacent pixel is summed. The sum of each 8×8 activity for both fields is computed to obtain the frame activity. While this technique suffices to sort frames based on spatial activity, other techniques may be employed to measure or calculate the relative spatial activity without departing from the scope of the present invention.

The pattern detector then analyzes the frame activity. Upon initialization, the activity of the first frame is computed and the first frame is declared B-type. For each subsequent frame, the following method is used. If the absolute difference in activity between the current frame and the previous frame is within a lower threshold and the previous frame is declared a B-type frame, or the difference in activity between the previous frame and the current frame is larger than an upper threshold and a previous frame is declared an anchor frame, the new frame is declared a B-type frame. If the difference is larger than an upper threshold and the previous frame is declared a B-type frame, or if the difference is smaller than a lower threshold and the previous frame is declared an anchor frame, the frame is determined to be an anchor frame. If a predetermined number of B-frames is detected in a row and a recognized pattern has previously emerged from this video, the current frame is declared an anchor frame. Otherwise, the frame is declared unknown and the next previous frame is assumed to be a non-anchor frame According to another aspect of the present invention, rather than a fixed threshold, a percentage difference may be computed.

The threshold results are then input to the pattern recognizer. After a number of consecutive frames (30 for example) with a repeating sequence, one of three patterns is determined:

1. 2 B-type—frames between each anchor frame
2. 1 B-type—frame between each anchor frame.
3. No B-type—frames between each anchor frame.

If no pattern can be recognized after a predetermined number of frames, e.g., 60 frames, "pattern unknown" results. This indicates that:

1. The source is not from an encoder.
2. The pattern is not recognizable due to low activity.
3. The pattern is not recognizable due to original encoding technique.

The frames are input to the encoder pre-processor where de-telecine is performed and the second encode frame type is determined. The second encoder frame type pattern is compared to the first encoder frame type pattern.

If the pattern detector output matches the second encoder B-type frame configuration (same number of B-type frames between anchor frames), then the second encoder determines if it is frame type synchronized with the first encoder. If the two encoders are synchronized where the same frame type is used for the same frame, nothing is done. If the two encoders are not frame type synchronized, the second encoder will adjust frame types to force synchronization.

For example:

First Encoder (encode order): P B B P B B|P B B P B B P B B P B B P

Second Encoder (encode order): B P B B P B|B P B P B B P B B P B B P

Pattern out of sync detected ^

The bold frames have been altered. The first bold P is the same type as the second encoder's original type, however its temporal reference or display order has changed since there is only 1 B-type frame following this P-type frame. The bold B is the same type, but now its motion vectors to the backward anchor frame is only 1 frame away instead of 2. The next bold P changed type from B-type to P-type to match the first encoder order. Its forward motion vectors are only 2 frames away.

Next example:

First Encoder (encode order): P B B P B B|P B B P B B P B B P B B P

Second Encoder (encode order): B B P B B P|B B P P B B P B B P B B P

Pattern out of sync detected ^

Alternative to avoid 2 P-type frames in a row:

Second Encoder (encode order): B B P B B P|B B P B P B P B B P B B P

Pattern out of sync detected ^

The bold frames have been altered.

The frame types will not be adjusted if an I-type frame is within a predetermined number of frames, e.g., 4 frames, of the out of sync detect point to avoid multiple P-type frames near an I-type frame. This avoids a large number of bits generated for the inserted P-type frame near an 1-type frame. Larger pictures cause the rate control to raise quantization levels and reduce picture quality. If multiple large pictures occur consecutively, the rate control must raise the quantization level significantly and objectionable quality loss may be seen.

Figure 2:
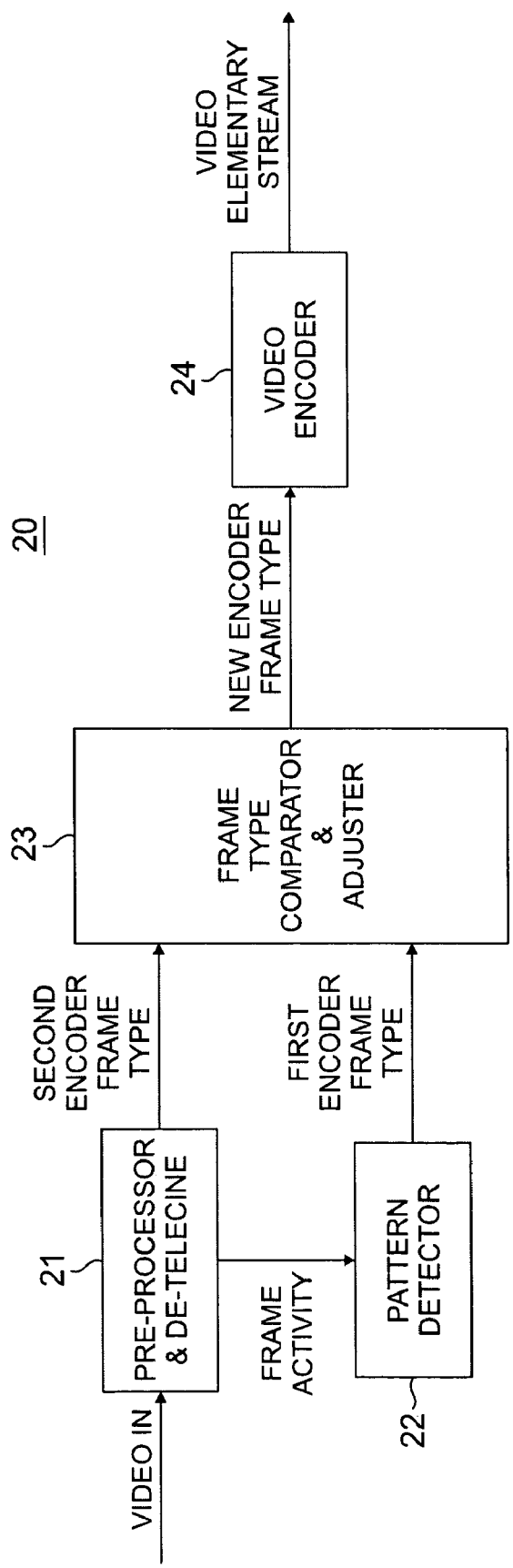
FIG. 2 depicts an exemplary embodiment of an anchor frame alignment system according to another aspect of the present invention.

FIG. 2 shows a block diagram of an exemplary embodiment of an anchor frame alignment system 20. Video is input to the Pre-processor and De-telecine 21, which determines the frame type for the second encoder and which determines the frame activity. An example of the pre-processor and De-telecine 21 is the Motorola DCII encoder.

The Pattern Detector 22 receives the frame activity from the Pre-processor and De-telecine 21, analyzes the frame activity and determines the frame type of the frames as encoded by the first encoder. The frame type is then input to the Frame Type Comparator and Adjuster 23. The Pattern Detector can be a general-purpose processor.

The Frame Type Comparator and Adjuster 23 then synchronizes the second encoder to the first encoder in terms of frame types. The Frame Type Comparator and Adjuster 23 can be a general-purpose processor, and may be the same as the Pattern Detector 22.

The new frame type is then input to the second encoder 24, which performs the encoding in the normal manner. An example of the second encoder 24 includes a 110 MHz C-Cube DvXpertII (E4) MPEG2 video compression chip.

Thus, an apparatus 20 for processing video that was previously encoded by a first encoder includes a second encoder 24, a processor 21, a pattern detector 22 and a frame-type comparator and adjuster 23.

Eventually, the second encoder 24 will re-encode the video that was originally encoded by the first encoder (not shown) based on the frame types of the first encoder as adjusted to remain frame-type synchronized with the first encoder.

The processor 21 receives the video coupled from the first encoder and determines frame activity data for each frame of the video. The processor also determines a potential frame type for subsequent encoding by the second encoder 24. The processor 21 divides a frame into a predetermined number of fields and divides each field into a predetermined number of blocks. The process then sums, for each of the blocks, an absolute difference between each horizontally adjacent pixel and each vertically adjacent pixel and adds a result of the summing for each of the fields to obtain the frame activity data. The frame activity data is then output to the pattern detector.

The pattern detector 22 is coupled to the processor 21 to receive the frame activity data for each frame of the video. From this frame activity date, the pattern detector 22 determines an encoded frame type for each frame encoded by the first encoder. This encoded frame type is output by the pattern detector 22 to the frame-type comparator and adjuster 23. The pattern detector 22 identifies anchor frames and non-anchor frames among a sequence of frames encoded by a first encoder using relative spatial activity or some other technique, such as edge detection, from the frame activity data. The pattern detector 22 also determines a pattern of frame types present in the sequence of frames encoded by the first encoder. The pattern of frame types present in sequence of frames as encoded by the first encoder is output to the frame-type comparator and adjuster 23.

Using relative spatial activity, the pattern detector 22 declares a current frame to be a non-anchor frame if an absolute difference in spatial activity between a current frame and a previous frame is within a lower threshold and a previous frame is declared a non-anchor frame, or the difference in spatial activity between a previous frame and a current frame is larger than an upper threshold and a previous frame is declared an anchor frame. The pattern detector 22 declares a current frame to be an anchor frame if a difference in spatial activity between a current frame and a previous frame is larger than an upper threshold and a previous frame is declared a non-anchor frame, or if an absolute difference in spatial activity between a current frame and a previous frame is within a lower threshold and a previous frame is declared an anchor frame. Finally, the pattern detector 22 declares a current frame to be of an unknown type if a difference in spatial activity between a current frame and a previous frame is not within a lower threshold or not more negative than a negative upper threshold or not larger than an upper threshold.

In an alternative implementation, the pattern detector 22 declares a current frame to be a non-anchor frame if a difference in spatial activity between a current frame and a previous frame is within a predetermined fixed percentage and a previous frame is declared a non-anchor frame, or if the spatial activity of a current frame is smaller than the spatial activity of a previous frame by more than a predetermined fixed percentage and a previous frame was declared an anchor frame.

The pattern detector 22 declares a current frame to be an anchor frame if a difference in spatial activity between a current frame and a previous frame is larger than a predetermined fixed percentage and a previous frame is declared a non-anchor frame, or if the absolute difference in spatial activity between a current frame and a previous frame is smaller than a lower threshold and a previous frame is declared an anchor frame. Finally, the pattern detector 22 declares a current frame to be of an unknown type if a difference in spatial activity between a current frame and a previous frame is not within a first predetermined percentage or not larger than a second predetermined fixed percentage.

To determine the frame pattern, the pattern detector 22 searches for one of three frame type patterns, including: two non-anchor frames between each anchor frame; one non-anchor frame between each anchor frame or no non-anchor frames between each anchor frame. The pattern detector 22 declares pattern unknown if no pattern can be recognized after a predetermined number of frames.

The frame-type comparator and adjuster 23 is coupled to the processor 21 and to the pattern detector 22. The frame-type comparator and adjuster 23 receives the encoded frame type encoded by the first encoder and the potential frame type for subsequent encoding by the second encoder 24, compares the two, and synchronizes an actual frame type of subsequent encoding by the second encoder 24 to the encoded frame type of the first encoder by adjusting the potential frame type for subsequent encoding by the second encoder 24 to a modified frame type. This includes changing one or more anchor frames to one or more non-anchor frames, or vice versus. The frame-type comparator and adjuster 23 frame-type-synchronizes the second encoder 24 to the pattern of anchor frames as encoded by the first encoder to thereby encode the identified anchor frames output by the first encoder as anchor frames.

The frame-type comparator and adjuster 23 detects an out-of-synchronization state, and determines whether an I-type frame lies within a predetermined number of frames from a point in a frame sequence at which an out-of-synchronization state was detected. The frame-type comparator and adjuster 23 then only modifies one or more frame types if an I-type frame is not within the point in the frame sequence at which the out-of-synchronization state was detected.

The second encoder 24 is coupled to the frame-type comparator and adjuster 23 and receives the modified frame type and re-encodes the video using the modified frame type.

Figure 3:
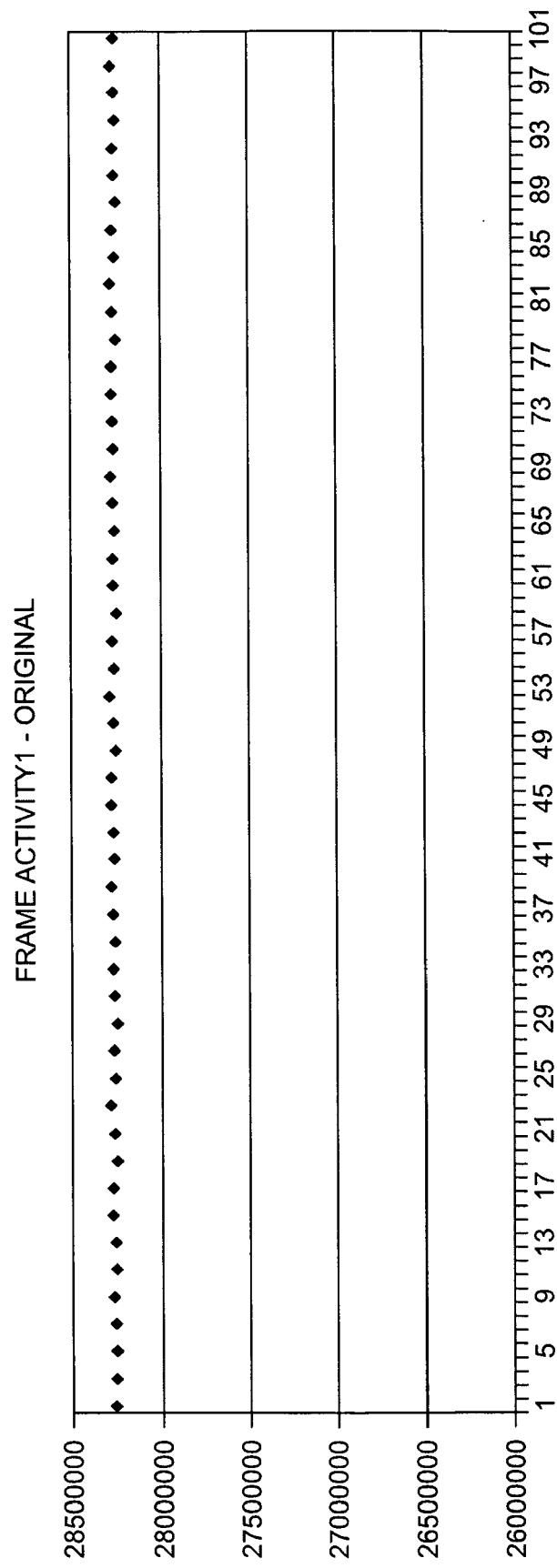
FIG. 3 depicts a plot of spatial activity calculated in accordance with one aspect of the present invention of a source sequence before encoding.
Figure 4:
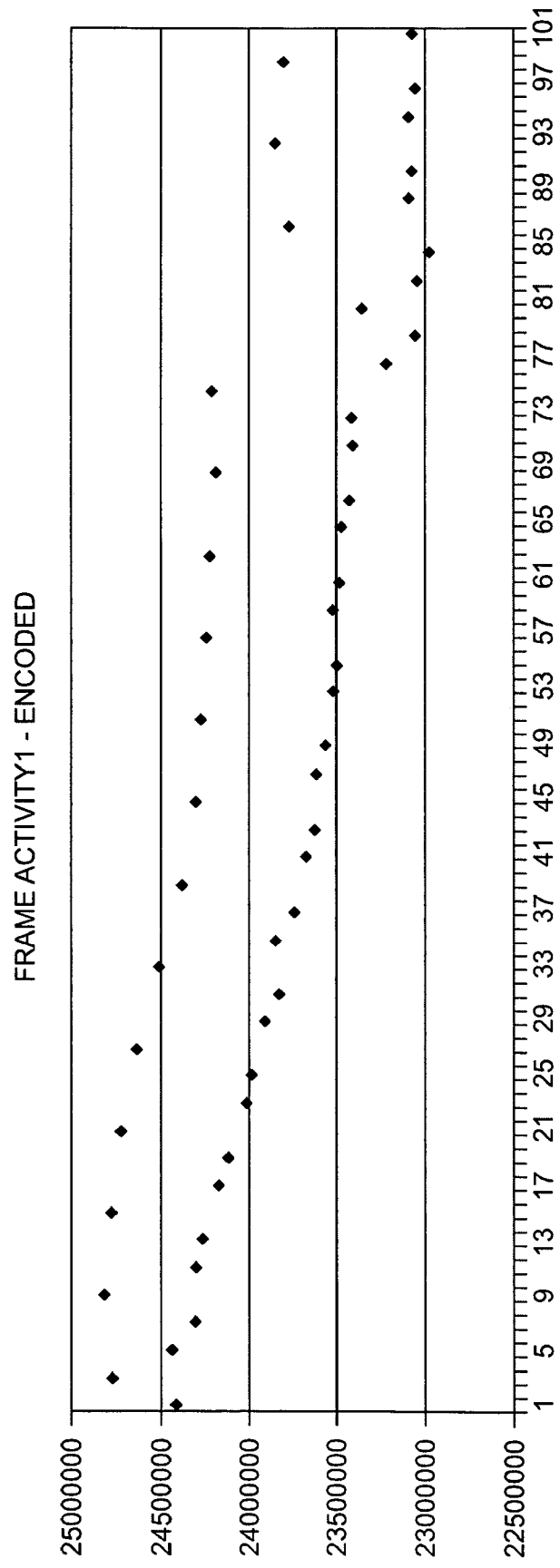
FIG. 4 depicts a plot of spatial activity calculated in accordance with one aspect of the present invention of the source sequence of FIG. 3 after encoding.
Figure 5:
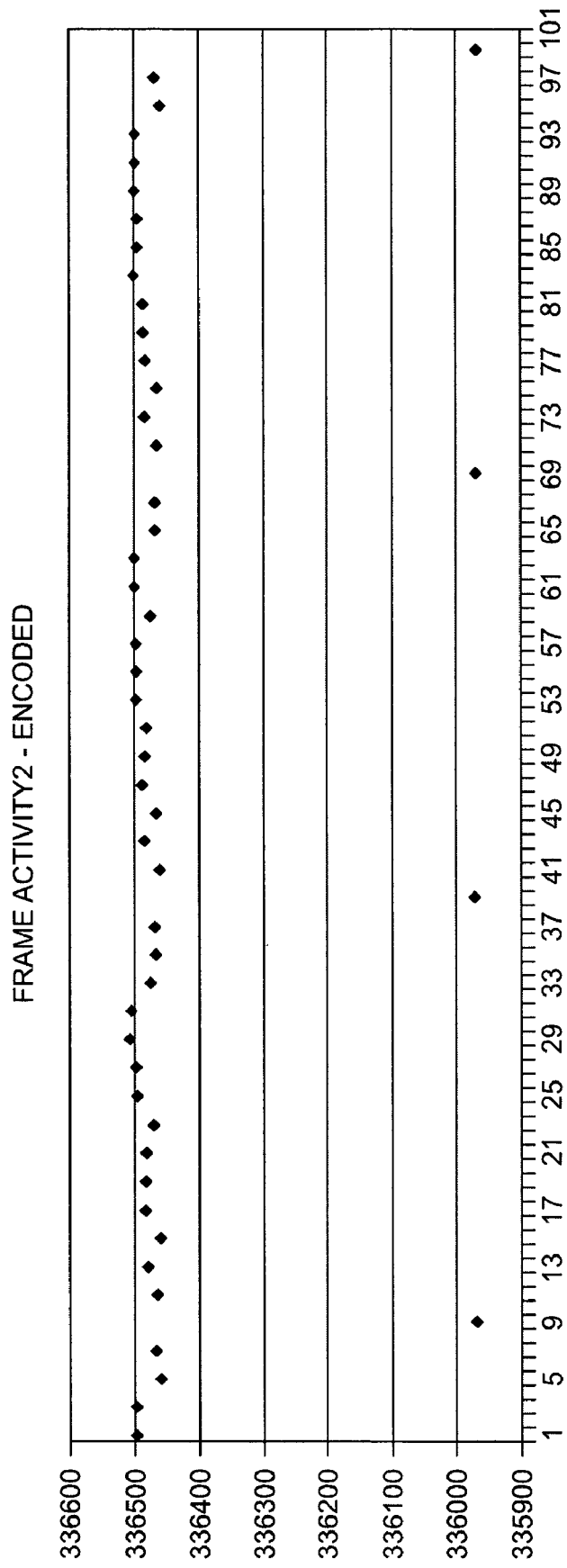
FIG. 5 depicts a plot of spatial activity calculated in accordance with one aspect of the present invention of a low activity source sequence after encoding.

FIGS. 3-5 show results from performing spatial activity calculations over a sequence of pictures. FIG. 3 is the source sequence before encoding. As expected, activity is constant for all frames within a single scene.

The same scene passed through the first encoder. FIG. 4 shows the frame activity. Notice the anchor frames have higher activity than the neighboring B-type frames. This sequence has 2 B-type frames between the anchor frames.

If the activity is very low with a black frame for example, the activity difference between frame types cannot be detected. FIG. 5 shows an example of a low activity sequence. For this sequence, the I-type frames had lower activity than the P-type or B-type frames.

According to another aspect of the present invention, rather than activity measurement, frame type may be performed using edge detection on each frame to determine the frame type. According to this technique, the difference in the number/strength of edges may be used to detect frame type.

Figure 6:
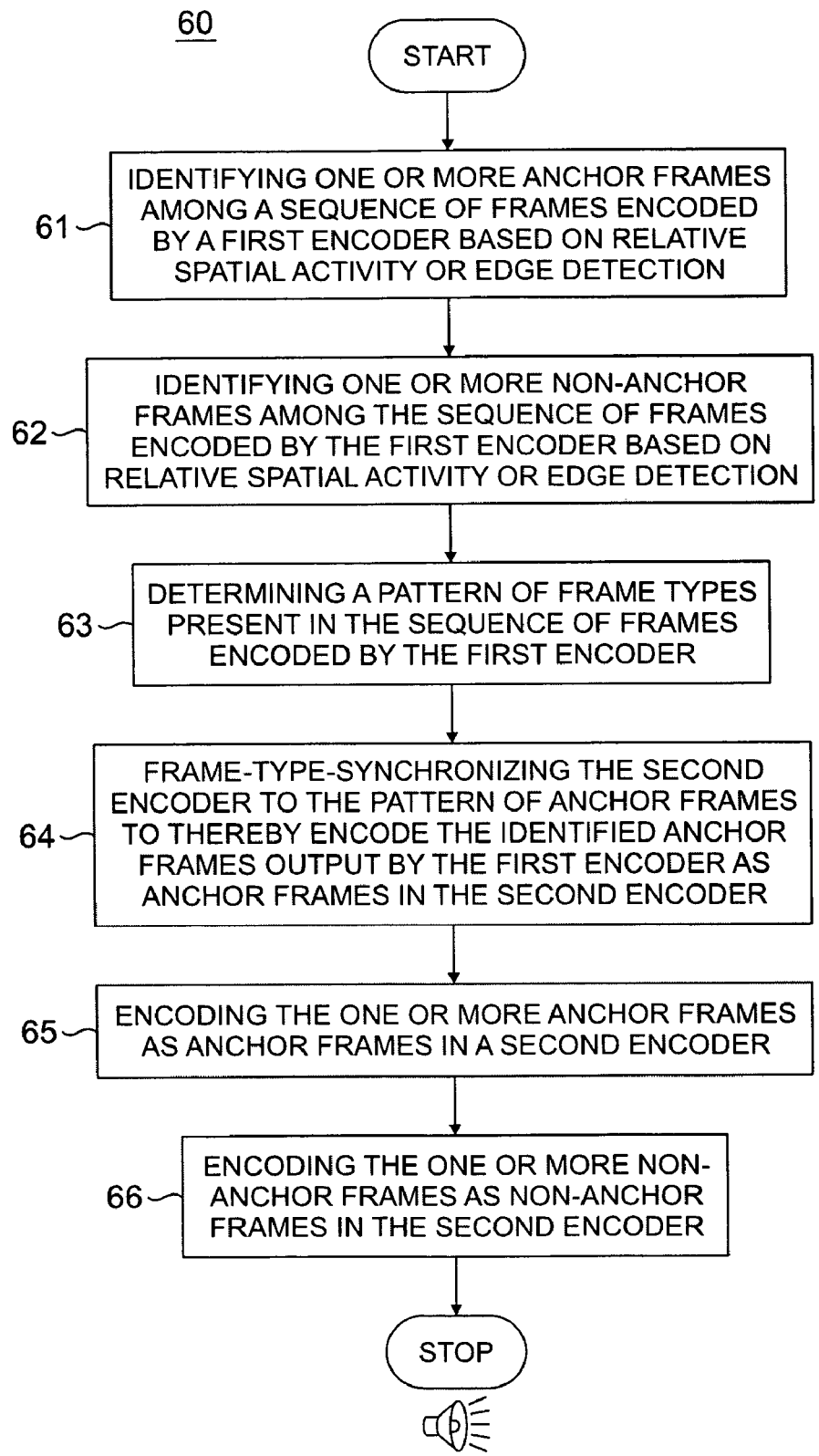
FIG. 6 depicts an exemplary embodiment of a method for processing video according to another aspect of the present invention.

Turning to FIG. 6, shown therein is an exemplary embodiment of a method for processing video according to one aspect of the present invention.

Figure 8:
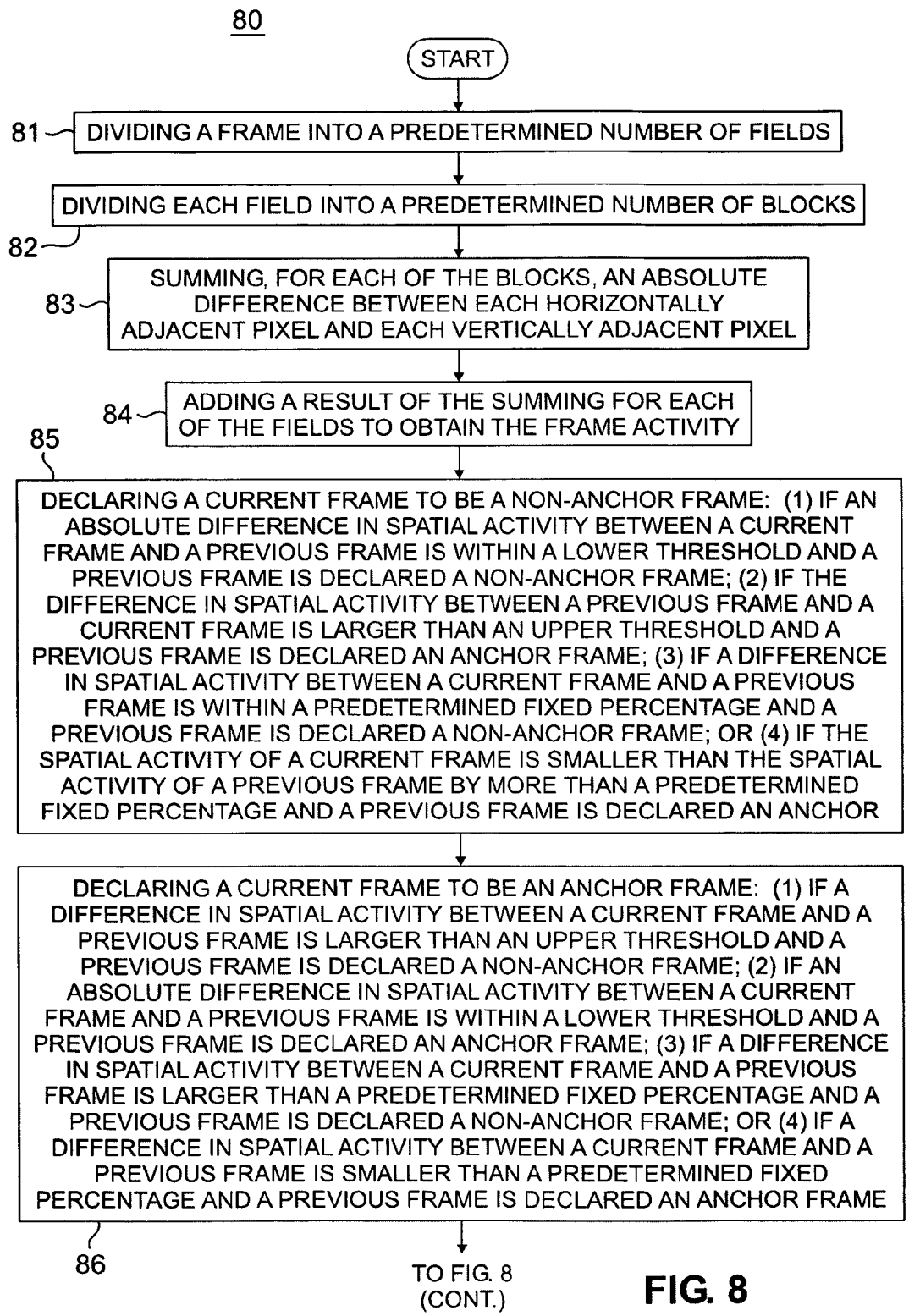
FIG. 8 depicts an exemplary embodiment of a method for identifying a frame type according to another aspect of the present invention.
Figure 8:
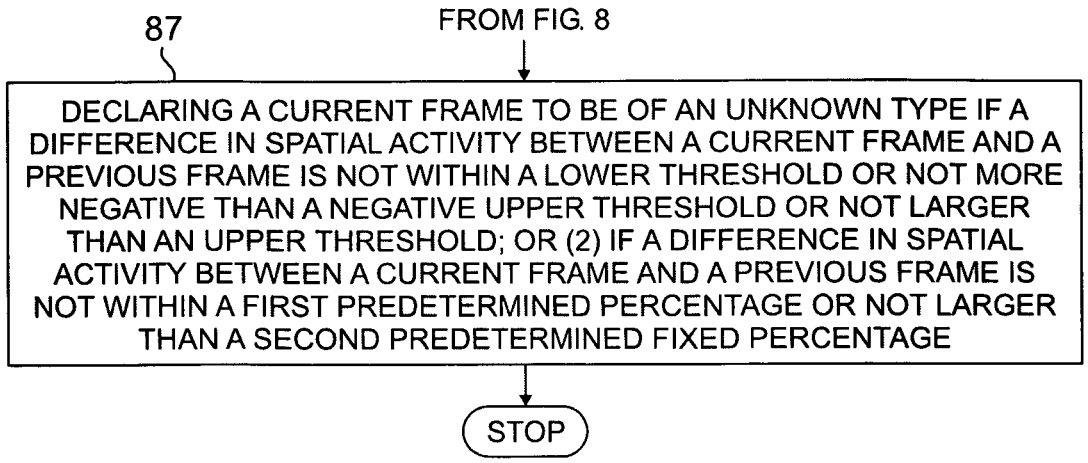

In element 61, the exemplary embodiment 60 identifies one or more anchor frames among a sequence of frames encoded by a first encoder based on relative spatial activity or edge detection. An exemplary embodiment 80 of a method for identifying the frame type based on relative spatial activity is depicted in FIG. 8.

In element 62, the exemplary embodiment 60 identifies one or more non-anchor frames among the sequence of frames encoded by the first encoder based on relative spatial activity or edge detection.

Figure 9:
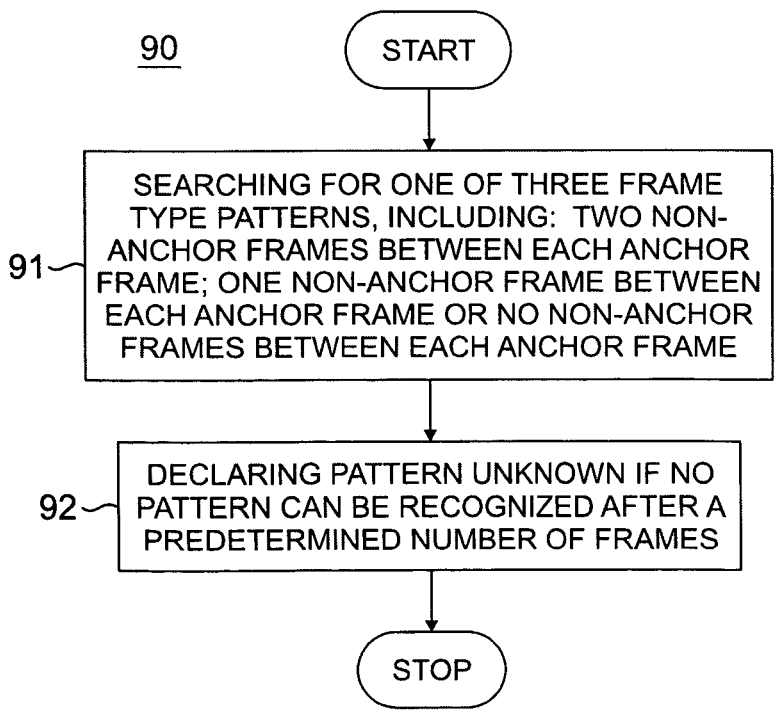
FIG. 9 depicts an exemplary embodiment of a method for determining a pattern of frame types according to another aspect of the present invention.

In element 63, the exemplary embodiment 60 determines a pattern of frame types present in the sequence of frames encoded by the first encoder. An exemplary embodiment 90 of a method for determining the frame type pattern is depicted in FIG. 9.

In element 64, the exemplary embodiment 60 frame-type-synchronizes the second encoder to the pattern of anchor frames to thereby encode the identified anchor frames output by the first encoder as anchor frames in the second encoder. An exemplary embodiment 70 of a method for frame-type-synchronizing is depicted in FIG. 7.

In element 65, the exemplary embodiment 60 encodes the one or more anchor frames as anchor frames in a second encoder.

In element 66, the exemplary embodiment 60 encodes the one or more non-anchor frames as non-anchor frames in a second encoder.

Figure 7:
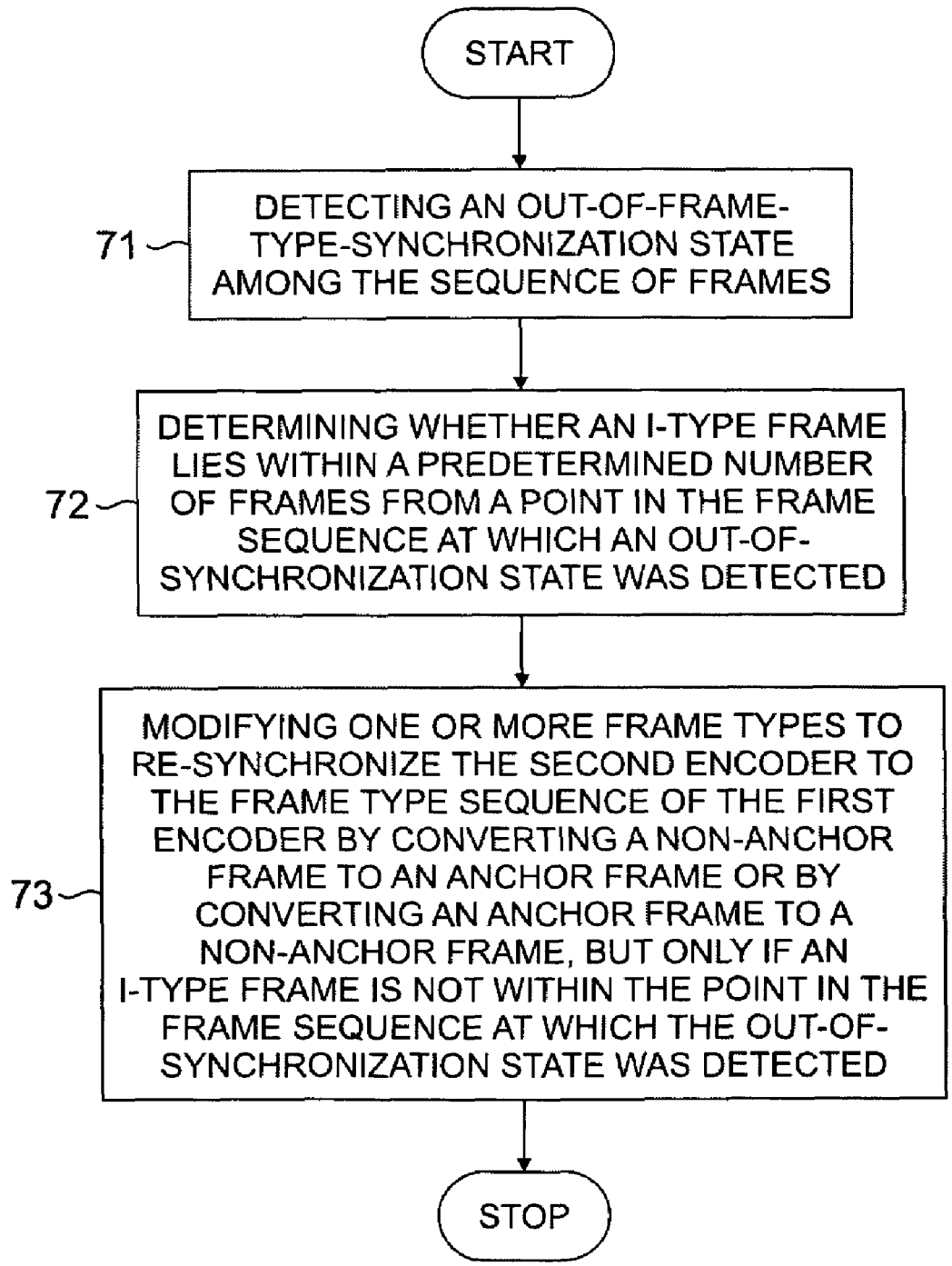
FIG. 7 depicts an exemplary embodiment of a method for frame-type-synchronization according to another aspect of the present invention.

Turning to FIG. 7, shown therein is an exemplary embodiment 70 of a method for frame-type-synchronizing the two encoders according to another aspect of the present invention.

In element 71, the exemplary embodiment 70 detects an out-of-frame-type-synchronization state among the sequence of frames.

In element 72, the exemplary embodiment 70 determines whether an I-type frame lies within a predetermined number of frames from a point in the frame sequence at which an out-of-synchronization state was detected.

In element 73, the exemplary embodiment 70 modifies one or more frame types to re-synchronize the second encoder to the frame type sequence of the first encoder by converting a non-anchor frame to an anchor frame or by converting an anchor frame to a non-anchor frame, but only if an I-type frame is not within the point in the frame sequence at which the out-of-synchronization state was detected.

Turning to FIG. 8, shown therein is an exemplary embodiment 80 of a method for identifying a frame type based on relative spatial activity according to another aspect of the present invention.

In element 81, the exemplary embodiment 80 divides a frame into a predetermined number of fields.

In element 82, the exemplary embodiment 80 divides each field into a predetermined number of blocks.

In element 83, the exemplary embodiment 80 sums, for each of the blocks, an absolute difference between each horizontally adjacent pixel and each vertically adjacent pixel.

In element 84, the exemplary embodiment 80 adds a result of the summing for each of the fields to obtain the frame activity.

In element 85, the exemplary embodiment 80 declares a current frame to be a non-anchor frame based on several possible alternative determinations, including: (1) if an absolute difference in spatial activity between a current frame and a previous frame is within a lower threshold and a previous frame is declared a non-anchor frame; (2) if the difference in spatial activity between a previous frame and a current frame is larger than an upper threshold and a previous frame is declared an anchor frame; (3) if a difference in spatial activity between a current frame and a previous frame is within a predetermined fixed percentage and a previous frame is declared a non-anchor frame; or (4) if the spatial activity of a current frame is smaller than the spatial activity of a previous frame by more than a predetermined fixed percentage and a previous frame is declared an anchor frame.

In element 86, the exemplary embodiment 80 declares a current frame to be an anchor frame based on several possible alternative determinations, including: (1) if a difference in spatial activity between a current frame and a previous frame is larger than an upper threshold and a previous frame is declared a non-anchor frame; (2) if an absolute difference in spatial activity between a current frame and a previous frame is within a lower threshold and a previous frame is declared an anchor frame; (3) if a difference in spatial activity between a current frame and a previous frame is larger than a predetermined fixed percentage and a previous frame is declared a non-anchor frame; or (4) if a difference in spatial activity between a current frame and a previous frame is smaller than a predetermined fixed percentage and a previous frame is declared an anchor frame.

In element 87, the exemplary embodiment 80 declares a current frame to be of an unknown type based on several possible alternative determinations, including: (1) if a difference in spatial activity between a current frame and a previous frame is not within a lower threshold or not more negative than a negative upper threshold or not larger than an upper threshold; or (2) if a difference in spatial activity between a current frame and a previous frame is not within a first predetermined percentage or not larger than a second predetermined fixed percentage.

Turning to FIG. 9, shown therein is an exemplary embodiment 90 of a method for determining a frame-type pattern according to another aspect of the present invention.

In element 91, the exemplary embodiment 90 searches for one of three frame type patterns, including: two non-anchor frames between each anchor frame; one non-anchor frame between each anchor frame or no non-anchor frames between each anchor frame.

In element 92, the exemplary embodiment 90 declares pattern unknown if no pattern can be recognized after a predetermined number of frames.

Figure 10:
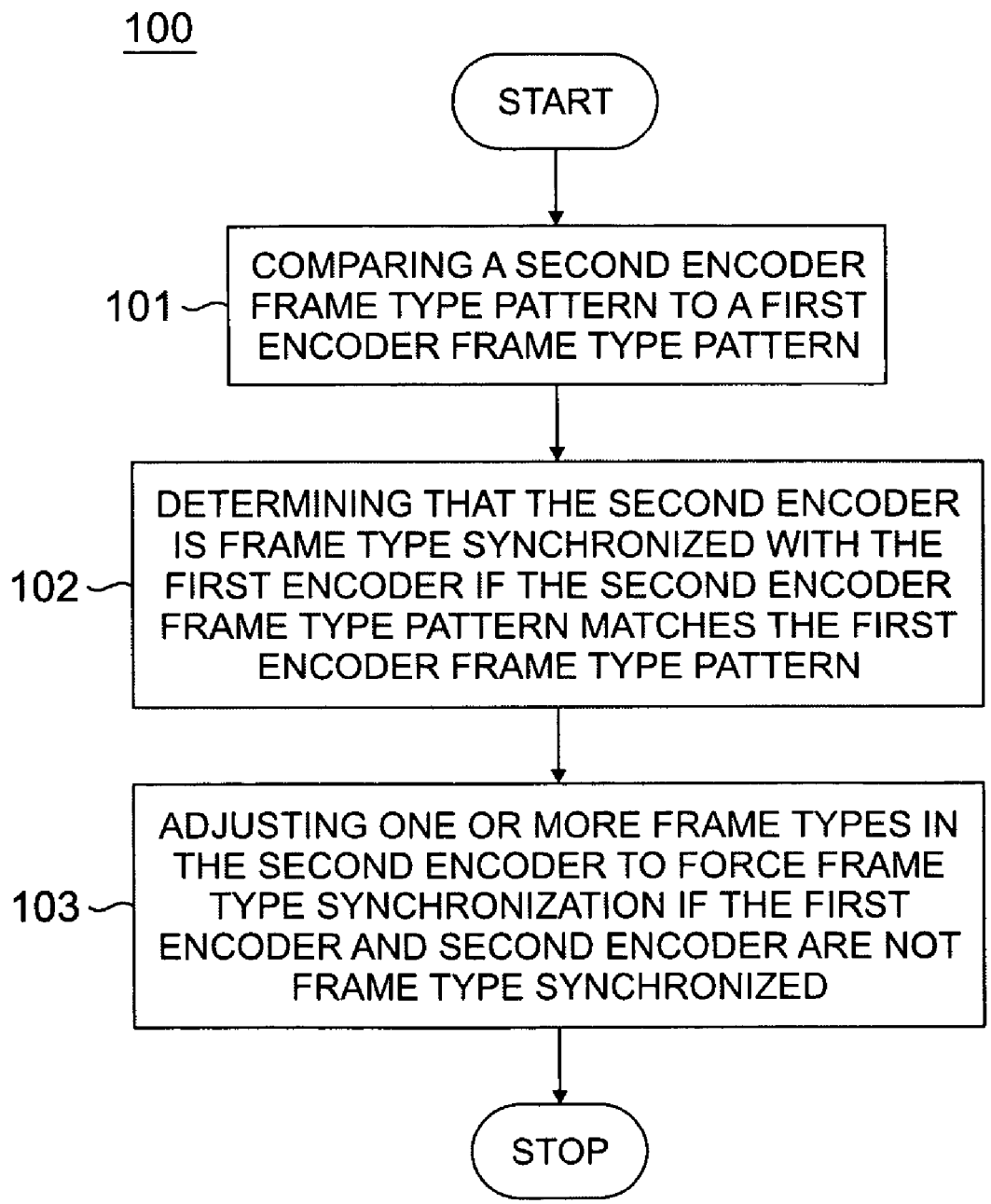
FIG. 10 depicts an exemplary embodiment of a method for frame-type-synchronization according to still another aspect of the present invention.

Turning to FIG. 10, shown therein is an exemplary embodiment of a method for frame-type-synchronizing according to yet another aspect of the present invention.

In element 101, the exemplary embodiment 100 compares a second encoder frame type pattern to a first encoder frame type pattern.

In element 102, the exemplary embodiment 100 determines that the second encoder is frame type synchronized with the first encoder if the second encoder frame type pattern matches the first encoder frame type pattern.

In element 103, the exemplary embodiment 100 adjusts one or more frame types in the second encoder to force frame type synchronization if the first encoder and second encoder are not frame type synchronized.

Although various embodiments are specifically illustrated and described herein, it will be appreciated that modifications and variations of the invention are covered by the above teachings and are within the purview of the appended claims without departing from the spirit and intended scope of the invention. For example, certain techniques for identifying anchor frames are disclosed herein, however, other techniques may be employed without departing from the scope of the present invention. In addition, certain techniques for measuring the relative spatial activity are disclosed herein, however, other techniques may be employed without departing from the scope of the present invention. Furthermore, these examples should not be interpreted to limit the modifications and variations of the invention covered by the claims but are merely illustrative of possible variations.

What is claimed is:

1. A method (60) for processing video, the method comprising the steps of:
    identifying (61) one or more anchor frames among a sequence of frames encoded by a first encoder
    determining (63) a pattern of frame types present in the sequence of frames encoded by the first encoder by searching (91) for one of three frame type patterns, including: two non-anchor frames between each anchor frame; one non-anchor frame between each anchor frame, or no non-anchor frames between each anchor frame; and
    encoding (65) the one or more anchor frames as anchor frames in a second encoder.

2. The method (60) according to claim 1, further comprising the steps of:
    identifying (62) one or more non-anchor frames among the sequence of frames encoded by the first encoder; and
    encoding (66) the one or more non-anchor frames as non-anchor frames in the second encoder.

3. The method (60) according to claim 1, further comprising the step of:
    frame-type-synchronizing (64) the second encoder to the pattern of anchor frames to thereby encode the identified anchor frames output by the first encoder as anchor frames in the second encoder.

4. The method (60) according to claim 1, wherein said identifying (61) includes identifying an anchor frame based on relative spatial activity.

5. The method (60) according to claim 3, wherein said frame-type-synchronizing (64) includes modifying (73) one or more frame types to re-synchronize the second encoder to the frame type sequence of the first encoder.

6. The method (60) according to claim 5, wherein said modifying (73) includes converting a non-anchor frame to an anchor frame.

7. The method (60) according to claim 5, wherein said modifying (73) includes converting an anchor frame to a non-anchor frame.

8. The method (60) according to claim 5, wherein said frame-type-synchronizing (64) includes:
    detecting (71) an out-of-synchronization state;
    determining (72) whether an I-type frame lies within a predetermined number of frames from a point in a frame sequence at which an out-of-synchronization state was detected; and
    modifying (73) one or more frame types only if an I-type frame is not within said point in the frame sequence at which the out-of-synchronization state was detected.

9. The method (60) according to claim 4, wherein said identifying (61) further comprises:
    dividing (81) a frame into a predetermined number of fields;
    dividing (82) each field into a predetermined number of blocks;
    summing (83), for each of the blocks, an absolute difference between each horizontally adjacent pixel and each vertically adjacent pixel; and
    adding (84) a result of the summing for each of the fields to obtain the frame activity.

10. The method (60) according to claim 4, wherein said identifying (61) further comprises:
    declaring (85) a current frame to be a non-anchor frame if an absolute difference in spatial activity between a current frame and a previous frame is within a lower threshold and a previous frame is declared a non-anchor frame.

11. The method (60) according to claim 4, wherein said identifying (61) further comprises:
    declaring (85) a current frame to be a non-anchor frame if the difference in spatial activity between a previous frame and a current frame is larger than an upper threshold and a previous frame is declared an anchor frame.

12. The method (60) according to claim 4, wherein said identifying (61) further comprises:
    declaring (86) a current frame to be an anchor frame if a difference in spatial activity between a current frame and a previous frame is larger than an upper threshold and a previous frame is declared a non-anchor frame.

13. The method (60) according to claim 4, wherein said identifying (61) further comprises:
    declaring (86) a current frame to be an anchor frame if an absolute difference in spatial activity between a current frame and a previous frame is within a lower threshold and a previous frame is declared an anchor frame.

14. The method (60) according to claim 4, wherein said identifying (61) further comprises:
    declaring (87) a current frame to be of an unknown type if a difference in spatial activity between a current frame and a previous frame is not within a lower threshold or not more negative than a negative upper threshold or not larger than an upper threshold.

15. The method (60) according to claim 4, wherein said identifying (61) further comprises:
    declaring (85) a current frame to be a non-anchor frame if a difference in spatial activity between a current frame and a previous frame is within a predetermined fixed percentage and a previous frame is declared a non-anchor frame.

16. The method (60) according to claim 4, wherein said identifying (61) further comprises:
    declaring (85) a current frame to be a non-anchor frame if the spatial activity of a current frame is smaller than the spatial activity of a previous frame by more than a predetermined fixed percentage and a previous frame is declared an anchor frame.

17. The method (60) according to claim 4, wherein said identifying (61) further comprises:
declaring (86) a current frame to be an anchor frame if a difference in spatial activity between a current frame and a previous frame is larger than a predetermined fixed percentage and a previous frame is declared a non-anchor frame.

18. The method (60) according to claim 4, wherein said identifying (61) further comprises:
declaring (86) a current frame to be an anchor frame if a difference in spatial activity between a current frame and a previous frame is smaller than a predetermined fixed percentage and a previous frame is declared an anchor frame.

19. The method (60) according to claim 4, wherein said identifying (61) further comprises:
declaring (87) a current frame to be of an unknown type if a difference in spatial activity between a current frame and a previous frame is not within a first predetermined percentage or not larger than a second predetermined fixed percentage.

20. The method (60) according to claim 15, wherein said determining (63) the pattern of frame types includes:
declaring (92) pattern unknown if no pattern can be recognized after a predetermined number of frames.

21. The method (60) according to claim 3, wherein said frame-type synchronizing (64) includes:
comparing (101) a second encoder frame type pattern to a first encoder frame type pattern;
determining (102) that the second encoder is frame type synchronized with the first encoder if the second encoder frame type pattern matches the first encoder frame type pattern; and
adjusting (103) one or more frame types in the second encoder to force frame type synchronization if the first encoder and second encoder are not frame type synchronized.

22. A method (60) for processing video, the method comprising the steps of:
identifying (61) one or more anchor frames among a sequence of frames encoded by a first encoder by using edge detection on each frame to identify a difference in a number and a strength of edges in a frame as a basis for determining frame type; and
encoding (65) the one or more anchor frames as anchor frames in a second encoder.

23. An apparatus (20) for processing video that was previously encoded by a first encoder comprising:
a second encoder (24) to re-encode the video;
a processor (21) receiving the video coupled from a first encoder, determining frame activity data for each frame of the video by dividing a frame into a predetermined number of fields, dividing each field into a predetermined number of blocks, summing, for each of the blocks, an absolute difference between each horizontally adjacent pixel and each vertically adjacent pixel, and adding a result of the summing for each of the fields to obtain the frame activity data, and determining a potential frame type for subsequent encoding by the second encoder (24);
a pattern detector (22) coupled to the processor to receive the frame activity data for each frame of the video and to determine an encoded frame type for each frame encoded by the first encoder by searching for one of three frame type patterns, including: two non-anchor frames between each anchor frame one non-anchor frame between each anchor frame or no non-anchor frames between each anchor frame; and
a frame-type comparator and adjuster (23) coupled to the processor (21) and to the pattern detector (22) to receive the encoded frame type encoded by the first encoder and the potential frame type for subsequent encoding by the second encoder (24), to synchronize an actual frame type of subsequent encoding by the second encoder (24) to the encoded frame type of the first encoder by adjusting the potential frame type for subsequent encoding by the second encoder (24) to a modified frame type, wherein said second encoder (24) is coupled to the frame-type comparator and adjuster (23) and receives the modified frame type and re-encodes the video using the modified frame type.

24. The apparatus (20) according to claim 23, wherein said pattern detector (22) identifies one or more anchor frames among a sequence of frames encoded by a first encoder and said second encoder (24) encodes the one or more anchor frames as anchor frames.

25. The apparatus (20) according to claim 23, wherein said pattern detector (22) identifies one or more non-anchor frames among the sequence of frames encoded by the first encoder and said second encoder (24) encodes the one or more non-anchor frames as non-anchor frames.

26. The apparatus (20) according to claim 23, wherein said pattern detector (22) determines a pattern of frame types present in the sequence of frames encoded by the first encoder.

27. The apparatus (20) according to claim 23, wherein the frame-type comparator and adjuster (23) frame-type-synchronizes the second encoder (24) to the pattern of anchor frames as encoded by the first encoder to thereby encode the identified anchor frames output by the first encoder as anchor frames.

28. The apparatus (20) according to claim 23, wherein said pattern detector (22) identifies an anchor frame based on relative spatial activity.

29. The apparatus (20) according to claim 27, wherein said frame-type comparator and adjuster (23) frame-type-synchronizes the second encoder (24) to the first encoder by modifying one or more frame types to be encoded by the second encoder (24) to force synchronization of the second encoder (24) to the frame type sequence of the first encoder.

30. The apparatus (20) according to claim 29, wherein said frame-type comparator and adjuster (23) converts one or more non-anchor frames to one or more anchor frames to force synchronization.

31. The apparatus (20) according to claim 29, wherein said frame-type comparator and adjuster (23) converts one or more anchor frames to one or more non-anchor frames to force synchronization.

32. The apparatus (20) according to claim 29, wherein said frame-type comparator and adjuster:
detects an out-of-synchronization state;
determines whether an I-type frame lies within a predetermined number of frames from a point in a frame sequence at which an out-of-synchronization state was detected; and
modifies one or more frame types only if an I-type frame is not within said point in the frame sequence at which the out-of-synchronization state was detected.

33. The apparatus (20) according to claim 23, wherein pattern detector (22):
   declares a current frame to be a non-anchor frame if an absolute difference in spatial activity between a current frame and a previous frame is within a lower threshold and a previous frame was declared a non-anchor frame.

34. The apparatus (20) according to claim 23, wherein pattern detector (22):
   declares a current frame to be a non-anchor frame if a difference in spatial activity between a current frame and a previous frame is more negative than a negative upper threshold and a previous frame was declared an anchor frame.

35. The apparatus (20) according to claim 23, wherein said pattern detector (22):
   declares a current frame to be an anchor frame if a difference in spatial activity between a current frame and a previous frame is larger than an upper threshold and a previous frame was declared a non-anchor frame.

36. The apparatus (20) according to claim 23, wherein said pattern detector (22):
   declares a current frame to be an anchor frame if an absolute difference in spatial activity between a current frame and a previous frame is smaller than a lower threshold and a previous frame was declared an anchor frame.

37. The apparatus (20) according to claim 23, wherein said pattern detector (22):
   declares a current frame to be of an unknown type if a difference in spatial activity between a current frame and a previous frame is not within a lower threshold or not more negative than a negative upper threshold or not larger than an upper threshold.

38. The apparatus (20) according to claim 23, wherein said pattern detector (22):
   declares a current frame to be a non-anchor frame if a difference in spatial activity between a current frame and a previous frame is within a predetermined fixed percentage and a previous frame was declared a non-anchor frame.

39. The apparatus (20) according to claim 23, wherein said pattern detector (22):
   declares a current frame to be a non-anchor frame if the spatial activity of a current frame is smaller than the spatial activity of a previous frame by more than a predetermined fixed percentage and a previous frame was declared an anchor frame.

40. The apparatus (20) according to claim 23, wherein said pattern detector (22):
   declares a current frame to be an anchor frame if a difference in spatial activity between a current frame and a previous frame is larger than a predetermined fixed percentage and a previous frame is declared a non-anchor frame.

41. The apparatus (20) according to claim 23, wherein said pattern detector (22):
   declares a current frame to be an anchor frame if a difference in spatial activity between a current frame and a previous frame is within a predetermined fixed percentage and a previous frame is declared an anchor frame.

42. The apparatus (20) according to claim 33, wherein said pattern detector (22):
   declares a current frame to be of an unknown type if a difference in spatial activity between a current frame and a previous frame is not within a first predetermined percentage or not larger than a second predetermined fixed percentage.

43. The apparatus (20) according to claim 23, wherein said pattern detector (22):
   declares pattern unknown if no pattern can be recognized after a predetermined number of frames.

44. The apparatus (20) according to claim 23, wherein said frame-type comparator and adjuster (23):
   compares a second encoder frame type pattern to a first encoder frame type pattern;
   determines that the second encoder is frame type synchronized with the first encoder if the second encoder frame type pattern matches the first encoder frame type pattern; and
   adjusts one or more frame types in the second encoder (24) to force frame type synchronization if the first encoder and second encoder (24) are not frame type synchronized.

* * * * *